United States Patent [19]
Kadotani et al.

[11] B 3,923,725
[45] Dec. 2, 1975

[54] METHOD FOR FORMING EPOXY RESIN PRODUCTS

[75] Inventors: Kenzo Kadotani; Tatuo Honda; Tokio Isogai, all of Hitachi, Japan

[73] Assignee: Hitachi, Ltd., Japan

[22] Filed: Sept. 29, 1972

[21] Appl. No.: 293,378

[44] Published under the Trial Voluntary Protest Program on January 28, 1975 as document no. B 293,378.

[52] U.S. Cl. ................................. 260/37 EP; 260/9
[51] Int. Cl.² ............................................ C08K 9/04
[58] Field of Search .............. 260/37 EP; 106/308 N

[56] References Cited
UNITED STATES PATENTS

| | | | |
|---|---|---|---|
| 2,928,809 | 3/1960 | Hicks | 260/47 |
| 3,288,747 | 11/1966 | Sussman | 260/37 EP |
| 3,471,435 | 10/1969 | Miller | 260/37 EP |
| 3,726,841 | 4/1973 | Mirolli | 260/37 EP |

OTHER PUBLICATIONS
Handbook of Epoxy Resins, Lee & Neville, McGraw–Hill Book Co., 1967, p. 9–8, relied upon.

Handbook of Epoxy Resins, Lee & Neville, pp. 9–14, relied upon.

Primary Examiner—Allan Lieberman
Assistant Examiner—S. L. Fox
Attorney, Agent, or Firm—Craig & Antonelli

[57] ABSTRACT

Epoxy resin formed articles comprising inorganic or organic filler materials or structural elements and obtained by using an acid anhydride as a hardner are formed by treating said filler materials or structural elements with a surface active agent such as a quaternary ammonium salt, impregnating said treated filler materials or structural elements with an epoxy resin and curing said epoxy resin with heat. The thus obtained epoxy resin formed articles have excellent properties in electrical insulating resistance and mechanical strengths and these properties can be maintained unchanged.

19 Claims, 5 Drawing Figures

METHOD FOR FORMING EPOXY RESIN PRODUCTS

BACKGROUND OF THE INVENTION

Formed articles obtained by impregnating inorgainc filler materials or structural elements with an epoxy resin have excellent characteristics such as high mechanical strengths, high electrical resistance, and outstanding resistance to chemicals; for this reason, they are widely used as an insulating or structural material in electric and other machines and appliances such as an insulating rod for circuit breakers and transformers, insulated coils, and a rotor body of high-speed centrifuges.

However, along with the current trend of machines and appliances to enlarge in size and to improve in performance, there have been ever intensifying requests for further improvement in dimensional accuracy and electrical insulation characteristics of the formed epoxy resin articles and improvement in forming efficiency. These requests could not be met with conventional forming techniques. For example, an insulating rod, formed in accordance with a conventional technique by vacuum impregnation of a rolled glass cloth with an epoxy resin frequently reveals such defects as wrinkled surface and voids. FIG. 1 shows an example of an article having such defects. FIG. 1 is a cross-sectional view of an insulating rod, wherein 1 is vacant space which is filled with a mandrel during the formation, 2 is a void, 3 is a wound layer comprising glass cloth and an epoxy resin and 4 is wrinkled surface. Corona voltage at such a defective part has been known from actual measurements to be less than one half of that of a defectless part. Consequently, development of a method for making a formed epoxy resin article without such defects has been long awaited, particularly in the field of high-voltage machines and appliances.

It has been known that elimination of the air trapped in the resin matrix is necessary in order to improve electrical characteristics of formed epoxy resin articles. For this purpose a pressure forming process has been adopted. According to this process, after impregnation of filler materials or structural elements with an epoxy resin, the resin is cured under a pressure of several tens to several hundreds kg/cm$^2$ to reduce inner defects of the formed article and hence to improve electrical characteristics. However, the said process requires a large pressure vessel and pressure device for oil pressure or air pressure, resulting in decreased operational efficiency and difficulties in forming a large article. Moreover, the pressure process has disadvantages in that deformation in the surface layer of an formed article occurs more easily than in the case of a vacuum impregnation process so that formed articles with a high dimensional accuracy are difficult to obtain.

The relation between shape and electrical characteristics of the formed article will be explained below by referring to FIG. 2 which shows an oblique view of a section of an insulated coil used in generators, motors, transformers, and the like. The insulated coil is composed of insulated conductors 5 and insulation layers 6 and 7 which insulate an assembly of a number of said conductors. These insulation layers 6 and 7 provide electrical insulation as well as mechanical strengths to the insulated coil. The insulation layer itself is composed of wound layers of woven or non-woven glass fabrics, asbestos sheets, paper-backed mica sheets, or other fibrous materials, and of a thermosetting resin of high mechanical strengths and high insulation resistance such as an unsaturated polyester resin or an epoxy resin, which had impregnated or coated said wound layers and then cured. In cases where an insulated coil of said structure is made by using an epoxy resin for impregnating the insulation layer, there often appear voids in the resin at the corners of the coil owing to shrinkage of the epoxy resin during curing. When a voltage is applied to the conductor, the electrical field intensity becomes highest at the corners. If there are voids in at least one corner part, a corona discharge will take place in the voids. Once the corona discharge starts, insulating characteristics of the surrounding resin are rapidly lowered, which further promotes the corona discharge, and thus leads to increased amount of deteriorated resin and finally to deterioration of the whole coil in electrical and mechanical properties.

In order to manufacture a formed article of high quality without such defects as those mentioned above, a pressure molding process has conventionally been adopted. However, the pressure molding process requires special pressure devices and hence is unsuited for mass production as well as for the manufacture of formed articles in complicated shape.

SUMMARY OF THE INVENTION

This invention relates to a method for forming an epoxy resin products.

An object of this invention is to provide a method for obtaining a formed epoxy resin article containing inorganic or organic filler materials or structural elements, which has none of such defects as voids and deformation due to shrinkage during curing.

Another object of this invention is to provide a method for obtaining a formed epoxy resin article excellent in electrical or mechanical characteristics and which is kept from deformation due to shrinkage of the epoxy resin during curing.

A further object of this invention is to provide a method for obtaining, by use of an acid anhydride as the hardener, a formed epoxy resin article which is kept from lowering in electrical and mechanical characteristics seemingly due to the free acid which was either contained in the hardener or formed from the reaction between the hardener and the moisture either adhered to the surface of filler materials or structural elements or contained in the uncured resin.

A still further object of the invention is to provide a method for obtaining a formed epoxy resin article, which comprises treating the base materials, i.e. filler materials or structural elements, with a surface active agent such as quaternary ammonium salt which has a very strong affinity for the base materials and a prominent cure-promoting effect on epoxy resins, then impregnating the treated base materials with an epoxy resin, and curing the impregnated materials by heat treatment. Impregnation of the base materials is carried out, for example, in a blending tank. Since the epoxy resin which has been impregnated in the base materials hardens on contact with the quaternary ammonium salt therein, dissolution of the latter into an epoxy resin solution in the blending tank is so small that impregnation by immersion can be carried out repeatedly to advantage. When an epoxy resin solution to be impregnated contains an quaternary ammonium salt, the pot life of the epoxy resin solution decreases with an increase of

STATEMENTS OF THE INVENTION

Figure 1:
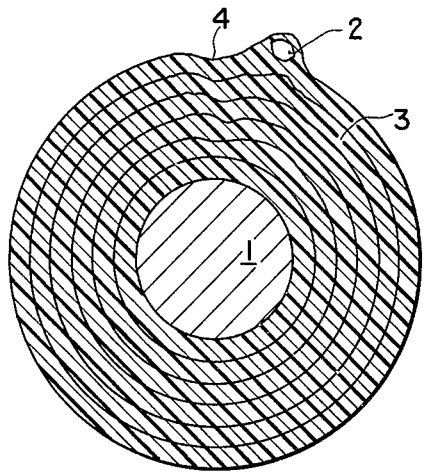
FIG. 1 shows a cross-sectional view of an insulating rod prepared by a conventional technique.
Figure 2:
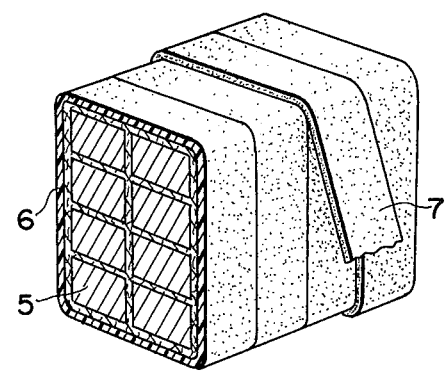
FIG. 2 shows an oblique, cross-sectional view of an insulated coil.

This invention provides a method for manufacturing a formed epoxy resin article containing inorganic or organic filler materials or structural elements by using an acid anhydride as a hardener, which comprises treating the filler materials or structural elements with a surface active agent such as a quaternary ammonium salt which has cure-promoting effect on an epoxy resin and is also able to decrease the interfacial tension between the epoxy resin and the filler materials or structural elements, impregnating the treated materials or elements with an epoxy resin and curing the resin by heat-treatment to obtain the formed epoxy resin article.

The epoxy resin for use in the method of this invention may be any resinous substance containing two or more epoxy groups in a molecule such as a condensation product obtained from a polyhydric alcohol and epichlorohydrin, a cyclic compound obtained by a peroxidation process, or the like. No particular limitation is placed on the type of epoxy resin except for those which are solid when impregnating the base materials.

The acid anhydrides to be used as the hardener include, for example, phthalic anhydride, maleic anhydride, hexahydrophthalic anhydride, Nadic Methyl Anhydride, tetrahydrophthalic anhydride, trimellitic anhydride, endomethylenetetrahydrophthalic anhydride, etc.

The inorganic or organic filler materials or structural elements for use in the method of this invention include those which are usually used, such as woven or nonwoven glass fabrics, asbestos sheets, paper-backed mica sheets, flake mica, etc.

Most surface active agents, except for nonionics, have cure-promoting effect on epoxy resins. However, the surface active agents capable of achieving the aforementioned objects of this invention should be those which are highly adsorbed on the structural elements of filler materials to be used in the formed epoxy resin article, have a strong affinity for the resin, and possess a high ability of promoting curing of the resin. The surface active agents which meet the above-mentioned requirements are quaternary ammonium salts such as alkyltrimethylammonium salts, alkyldimethylbenzylammonium chlorides, alkylaminoethanols, alkylaminosulfonates, etc.

Preferred examples of cationic surface active agents among alkyldimethylbenzylammonium chlorides represented by the formula,

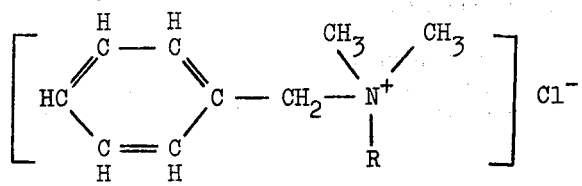

wherein R is alkyl having 8–18 carbon atoms, are dimethylbenzyltetradecylammonium chloride, dimethylbenzyldodecylammonium chloride, dimethylbenzylcetylammonium chloride, and the like.

Preferred examples of alkyltrimethylammonium salts represented by the formula,

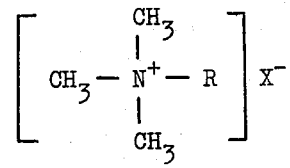

wherein R is alkyl having 8–18 carbon atoms and X is chlorine or bromine, are cetyltrimethylammonium bromide, octadecyltrimethylammonium chloride, lauryltrimethylammonium chloride, stearyltrimethylammonium chloride, and the like.

An example of alkylaminoethanols is a compound of the following formula:

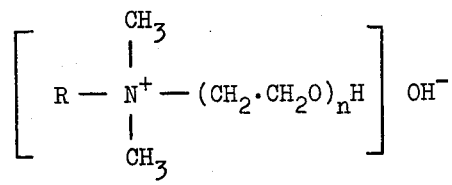

wherein R is alkyl having 9–18 carbon atoms and $n$ is an integer of from 1 to 3. Preferred examples of such compounds are those having $C_{11}H_{23}$ or $C_{13}H_{35}$ as R, and especially that having 30 percent of $C_{11}H_{23}$ and 70 percent of $C_{13}H_{25}$ is more preferable.

Alkylaminosulfonates include compounds of the following formula:

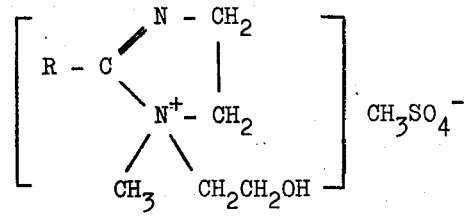

wherein R is alkyl having 2–11 carbon atoms. A preferred example of such compounds is a compound in which $R = C_6H_{11}$.

The methods for treating filler materials or structural elements with quaternary ammonium salts include those which are usually used, such as coating, impregnation, spraying and adsorption.

The method of this invention has been accomplished as a result of a detailed study on the mechanism of curing the epoxy resin with an acid anhydride hardener. The invention is explained below in further detail from the standpoint of curing mechanism. In the case where an acid anhydride is used as the hardner, the moisture either contained in the epoxy resin or adsorbed on the structural elements or filler materials to be incorporated in the epoxy resin reacts with the acid anhydride hardener to form a free acid. The structural elements or filler materials are desired to have a strong affinity for the resin. Materials with weak affinity for the resin such as, for example, glass fibers are dipped in a chromic acid solution or subjected to treatment with epoxysilane or aminosilane or with chromic chloride to be imparted with polarity on the surface, which will increase the affinity for the resin. However, the polarity imparted in order to increase adhesion of the structural elements or filler materials to the resin tends to adsorb the aforesaid highly polar free acid and moisture, thus resulting in more or less decrease in adhesion to the resin depending on the extend of adsorption.

When such an adsorbed layer containing considerable amounts of free acid exists over the surface of structural elements or filler materials, the formed epoxy resin article tends to be lowered in mechanical properties and still more in electrical properties and the decrease in these properties is extraordinary in some cases. For example, in the case where a glass fiber laminate containing about 50 percent by volume of glass fibers is formed using, for example, an epoxy-novolak resin with hexahydrophthalic anhydride as the hardener and benzyldimethylamine as a promoter, two laminates are prepared, the one containing no free acid while the other containing 4 percent of free acid. The AC breakdown voltage along the layer of each laminate are measured using an apparatus shown in FIG. 4. It is confirmed that the said breakdown voltage of the laminate containing 4 percent of free acid decreases by 10 to 20 percent, and that the corona voltage of the laminate containing 4 percent of free acid decreases by about 20 percent, comparing with that containing no free acid.

Since the free acid is formed chiefly from the reaction of an acid anhydride used as a hardener with water, the formation of the free acid might completely be prevented if starting materials for the formed epoxy resin article contain no moisture. However, since there is unavoidably present about 0.1 to about 0.4 percent of water in an epoxy resin, the formation of several percent of free acid from said water is inevitable when an acid anhydride is used as a hardener.

It might be possible to add a surface active agent in an epoxy resin solution preliminary in order to prevent concentration of the free acid formed on the surface of structural elements or filler materials in the formed epoxy resin article. When a surface active agent soluble in an epoxy resin is incorporated, formation of voids at the interface between the resin matrix and the structural elements or filler materials becomes less frequent, and some improvement in mechanical or electrical characteristics may be attained, but complete elimination of the formation of free acid from the layers as well as the defects derived therefrom is impossible.

According to the method of this invention, formation of a layer containing the aforesaid free acid can be prevented and, moreover, formation of voids at the interface between the resin phase and the structural elements or filler materials can also be prevented by pretreating, e.g. precoating, the structural elements or filler materials with a surface active agent having cure-promoting effect on an epoxy resin.

The precoating with a quaternary ammonium salt having a cure-promoting effect on an epoxy resin is applied advantageously to the part of base materials where electrical or mechanical properties are required particularly to remain unchanged. For example, in the case of a formed article in cylindrical form, a precoating of the aforesaid surface active agent is applied on the base materials the outer surface of which contains much more surface active agent so that curing will start from the part near the surface layer to avoid formation of wrinkled surface and voids. In the case of an article in the form of a rectangular rod, a precoating of the aforesaid surface active agent is applied on the surface layer and at edges whereby manufacture of a formed article having satisfactory characteristics at the edges, where the electrical field intensity becomes most severe, may be possible. Thus, it is possible to obtain formed epoxy resin articles containing no free acid layer and, accordingly, having improved properties especially in breakdown voltage. These improvements make it also possible to obtain formed epoxy articles reduced in size or with improved performance.

The invention is further illustrated below in detail with reference to Examples but the invention is not limited to the Examples. All parts and percentages in the Examples are by weight unless otherwise indicated.

EXAMPLE 1

Figure 3:
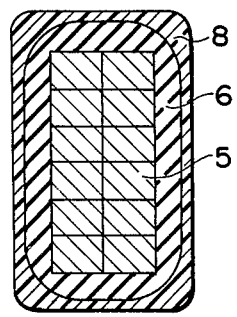
FIG. 3 shows a sectional view of an insulated coil in one embodiment of this invention.

A resin-impregnated coil for an induction motor was manufactured in the following manner. As shown in FIG. 3, the conductors 5 were wound with a sheet of pulp mica, flake mica and glass cloth to form insulating layers 6. All of the materials forming the insulating layers had been dipped in a 0.2 percent-alcohol solution of benzyldimethylamine having a cure-promoting effect on an epoxy resin, and then the alcohol used as solvent was removed by heating. The outermost layer of the insulating layers 6 and the edges 8 were impregnated with a 0.4 percent-alcohol solution of dimethylbenzyltetradecylammonium chloride and the solvent alcohol was removed by heating. The raw coil thus treated was dipped in a resin compound solution comprising 100 parts of an epoxy resin, Epicote 828 (produced by Shell Chemical Co., U.S.A.) and 75 parts of hexahydrophthalic anhydride, a hardner. Impregnation of the coil with the resin compound was conducted in a resin compounding tank at 80°C. under a reduced pressure of 0.01 mmHg for 1 hour. The coil impregnated with the epoxy resin was transfered from the compounding tank to a thermostat where curing was effected at 80°C. for 15 hours and then at 140°C. for 15 hours to obtain a resin impregnated coil.

The characteristic feature of the procedure followed in the present Example is such that coating of dimethylbenzyltetradecylammonium chloride having a strong cure-promoting effect was applied to the edges and the outermost layer of the insulating wound layer to effect rapid curing of the coated parts. When the resin in the edges and the outermost layer is cured in earlier stage, replenishment of the resin in these part of the coil to counter the shrinkage due to curing can be served by the resin supplied from inner part of the coil where a high level of electrical and mechanical properties is required not so much. Thus a coil which conforms to the use conditions can be obtained.

The coating of dimethylbenzyltetradecylammonium chloride at edges (8) can be applied to the entire depth of the insulating layers. However, it was found according to the experimental results obtained by the present inventor that it is sufficient to apply the coating to one tenth to one half of the entire depth. The amount of dimethylbenzyltetradecylammonium chloride to be applied is not critical so long as it is present in sufficient amount to cause curing of the resin to proceed more rapidly in the coated part than in the uncoated part.

The second advantage offered by the present procedure is an increased efficiency of the operation because the coil can be removed from the resin compounding tank shortly after impregnation with the epoxy resin. The quaternary ammonium salt, which is a cure-promoting agent, applied to the outermost layer of the insulating wound layers is adsorbed by the insulating wound materials so strongly that it can cause curing of the epoxy resin on the outer surface of the wound layers without dissolving into the compounded epoxy resin solution. The fluid epoxy resin remained in the inner solution. The fluid epoxy resin remained in the inner insulating wound layers, where the cure-promoting agent has not been applied, is completely enclosed by the solidified outer layers and hence it will not flow out of the coil. Consequently, when the outer layer of the coil cures, the coil can be removed from the resin compounding tank which results in the shortening of the working hour. The pot life of epoxy resin solution in the compounding tank remains unchanged because there is no contamination of the resin solution with the cure-promoting agent applied to the insulating wound layers. Consequently, the epoxy resin remained in the tank can be used repeatedly to economical advantage an replenishment of a fresh resin.

EXAMPLE 2

45 sheets of glass cloths ECL-13350 BX (product of Nitto Boseki Co., Ltd.), which had been sprayed with a 1.5 percent-aqueous solution of dimethyldidecylaminoethanol, were piled one upon another, pressed between the metal plates to a thickness of 15 mm, and dried at 70°C. under a reduced pressure of 0.01 mmHg for 3 hours. The resulting glass cloth laminate was impregnated under vacuum with a resin solution comprising 100 parts of an epoxy resin (ERL-4221 produced by Union Carbide Corp., U.S.A.), 90 parts of hexahydrophthalic anhydride as an acid anhydride hardener, and 0.3 part of benzyldimethylamine as a cure-promoter. After completion of the impregnation, the impregnated laminate was thermally cured first at 70°C. for 5 hours, then at 120°C. for 15 hours, and further at 150°C. for 15 hours. After completion of the curing, the glass cloth laminate, 15 mm in thickness, was removed from the metal mold.

REFERENTIAL EXAMPLE 1

In order to confirm the effect of dimethyldidecylaminoethanol sprayed on the glass cloths, dimethyldidecylaminoethanol of the same amount as that supported on the glass cloths in Example 2 was mixed with a resin solution the composition of which as the same as in Example 2, in place of being sprayed on glass cloths, and a glass cloth laminate was prepared in a manner similar to that described in Example 2.

REFERENTIAL EXAMPLE 2

In order to make clear the effect of dimethyldidecylaminoethanol, a laminate was prepared without using said compound in a manner similar to that described in Example 2 except for heating at 70°C. for 15 hours instead of 5 hours in the initial curring of the laminate.

Figure 4A:
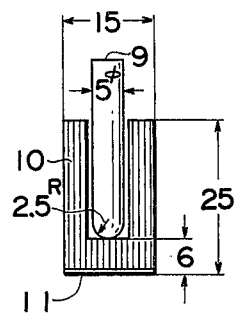
FIG. 4 shows cross-sectional views of electrodes and test specimens used in testing the AC breakdown voltage, (a) being those for use in testing the breakdown voltage along layers and (b) in testing the breakdown voltage through layers.
Figure 4B:
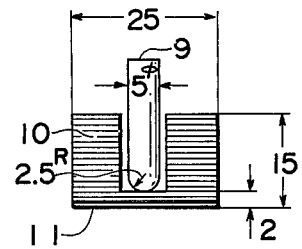

The AC breakdown voltages of the laminates prepared in Example 2 and Referential Examples 1 and 2 were measured by the testing method shown in FIG. 4.

The voltage applied in trichlorodiphenyl between a brass electrode rod, 5 mm diameter and rounded at the top to 2.5 R, and the silver paint coating 11 was elevated from 30 kV stepwise at a step of 3 kV and an interval of 20 seconds. The test was carried out on the test specimens kept at room temperature without any treatment and those kept in water at 100°C. for 2 hours. The results obtained were as shown in Table 1.

The pot life of each resin solution was also compared. The pot life was compared by measuring the time required for each resin solution to become the solution having a viscosity of 1000 centipoises. The results obtained were also shown in Table 1.

Table 1

| Example | AC breakdown voltage through layers (KV/2mm) | | AC breakdown voltage along layers (KV/6mm) | | Pot Life of the resin solution (hrs.) |
|---|---|---|---|---|---|
| | Before boiling | After boiling | Before boiling | After boiling | |
| Example 2 | 73 | 47 | 81 | 43 | 15 |
| Referential Example 2 | 65 | 43 | 75 | 34 | 5 |
| Referential Example 3 | 55 | 41 | 73 | 30 | 16 |

As is apparent from Table 1, incorporation of a surface active quaternary ammonium salt as a cure-promoting agent into the resin solution serves for the purpose of decreasing the formation of voids in some degree, but fails to eliminate undesirable layers containing the free acid produced therein and to give the resin sufficient pot life. The results show that the effects due to the presence of free acid in the layers can be eliminated only by treating the filler materials with a quaternary ammonium salt, which results in producing formed resin articles of excellent insulating properties.

What is claimed is:

1. A method for manufacturing a formed epoxy resin article comprising inorganic or organic filler materials or structural elements by using an acid anhydride as a hardener which comprises arranging said filler materials or structural elements in a desired configuration treating said filler materials or structural elements so arranged with a quaternary ammonium salt selected from the group consisting of an alkyldimethylbenzyl ammonium chloride represented by the formula:

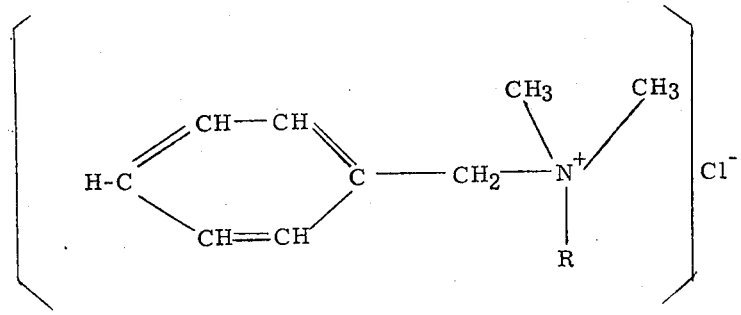

wherein R is alkyl having 8 to 18 carbon atoms, an alkylaminoethanol represented by the formula:

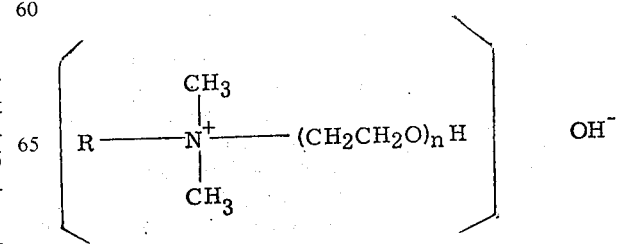

wherein R is alkyl having 9 to 18 carbon atoms and $n$ is an integer of from 1 to 3, an alkylaminosulfonate represented by the formula:

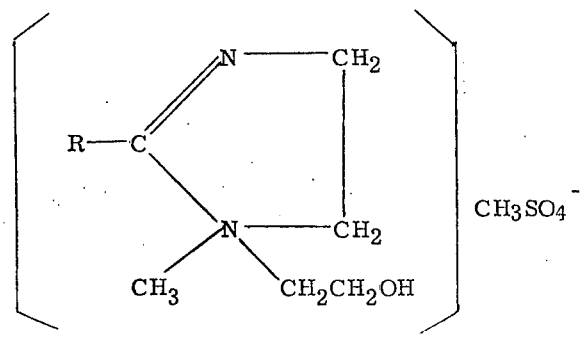

wherein R is alkyl having 2 to 11 carbon atoms, and an alkyltrimethyl ammonium salt represented by the formula:

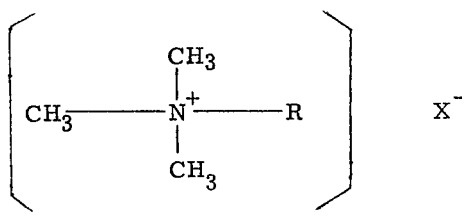

wherein R is alkyl having 8 to 18 carbon atoms and X is chloine or bromine, impregnating the treated filler materials or structural elements with a liquid epoxy resin containing two or more epoxy groups in each molecule said liquid epoxy resin including said acid anhydride, and curing said epoxy resin by heating.

2. A method according to claim 1, wherein said quaternary ammonium salt is dimethylbenzyltetradecylammonium chloride, dimethylbenzyldodecylammonium chloride, or dimethylbenzylcetylammonium chloride.

3. A method according to claim 2, wherein the quaternary ammonium salt is dimethylbenzyltetradecylammonium chloride.

4. A method according to claim 1, wherein said quaternary ammonium compound is an alkylaminoethynol, and further wherein R is $C_{11}H_{23}$ or $C_{13}H_{35}$.

5. A method according to claim 1, wherein the quaternary ammonium salt is dimethyldidecylaminoethanol.

6. A method according to claim 1, wherein said quaternary ammonium compound comprises a mixture of about 30 percent of an alkylaminoethanol in which R is $C_{11}H_{23}$ and about 70 percent of an alkylaminoethanol in which R is $C_{13}H_{23}$ and about 70 percent of an alkylamainoethanol in which R is $C_{13}H_{25}$.

7. A method according to claim 1, wherein the quaternary ammonium salt is cetyltrimethylammonium bromide, lauryltrimethylammonium chloride, stearyltrimethylammonium chloride or octadecyltrimethylammonium chloride.

8. A method according to claim 1, wherein said quaternary ammonium compound is an alkylaminosulfonate in which R is $C_6H_{11}$.

9. A method according to claim 1, wherein said filler materials or structural elements are sheet-like in form.

10. A method according to claim 9, wherein said filler materials or structural elements are glass fabrics.

11. A method according to claim 1, wherein said quaternary ammonium salt is applied to the outer surfaces of said inorganic or organic filler materials or structural elements when shaped in said configuration.

12. A method according to claim 11, wherein said article is in the form of a rectangular rod and said quaternary ammonium compound is applied on the surface layer and at the edges of said inorganic or organic filler materials or structural elements in said configuration.

13. A method according to claim 11, wherein sufficient quaternary ammonium compound is applied so that substantially all of the inorganic or organic filler materials or structural elements are impregnated therewith.

14. A method according to claim 11, wherein the amount of quaternary ammonium compound applied to said outer surfaces is sufficient so that said quaternary ammonium compound impregnates said inorganic or organic filler materials or structural elements from said outer surfaces to one-tenth to one-half of the entire depth of said inorganic or organic filler materials or structural elements.

15. A method according to claim 1, wherein said quaternary ammonium compound is applied to individual inorganic or organic filler materials or structural elements and thereafter said individual inorganic or organic filler materials or structural elements are assembled into said configuration.

16. A method according to claim 1, wherein said quaternary ammonium salt is applied in the form of a solution.

17. A method according to claim 16, wherein the solvent in said solution is water or alcohol.

18. A method according to claim 1, wherein said liquid epoxy resin contains about 0.1 to 0.4 percent water.

19. A method according to claim 1 wherein said filler materials or structural elements are treated with said quaternary ammonium salt by coating, impregnation, spraying or absorption.

* * * * *